United States Patent
Vogel et al.

(10) Patent No.: US 11,422,878 B2
(45) Date of Patent: Aug. 23, 2022

(54) CONTROL UNIT AND METHOD FOR OPERATING A CONTROL UNIT

(71) Applicant: Robert Bosch GmbH, Stuttgart (DE)

(72) Inventors: Andre Vogel, Boeblingen (DE); Axel Aue, Korntal-Muenchingen (DE); Margit Mueller, Asperg (DE); Ruediger Deibert, Esslingen A.N. (DE); Thomas Hartgen, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/164,387

(22) Filed: Feb. 1, 2021

(65) Prior Publication Data
US 2021/0311816 A1 Oct. 7, 2021

(30) Foreign Application Priority Data
Apr. 3, 2020 (DE) .......................... 102020204349.3

(51) Int. Cl.
| | |
|---|---|
| *G06F 11/07* | (2006.01) |
| *G06F 11/14* | (2006.01) |
| *G06F 11/32* | (2006.01) |
| *G06F 11/30* | (2006.01) |

(52) U.S. Cl.
CPC ........ *G06F 11/0772* (2013.01); *G06F 11/142* (2013.01); *G06F 11/3013* (2013.01); *G06F 11/327* (2013.01)

(58) Field of Classification Search
CPC ............... G06F 11/0772; G06F 11/142; G06F 11/3013; G06F 11/327

USPC .......................................................... 714/48
See application file for complete search history.

(56) References Cited

U.S. PATENT DOCUMENTS

| | | | |
|---|---|---|---|
| 2015/0337806 A1* | 11/2015 | Damgaard ............. | G05B 15/02 700/287 |
| 2016/0147636 A1* | 5/2016 | Sinha .................. | G06F 11/3612 714/38.1 |

FOREIGN PATENT DOCUMENTS

DE  102015213831 A1  1/2017

OTHER PUBLICATIONS

Wikipedia "shutdown" page for computing, retrieved from https://en.wikipedia.org/wiki/Shutdown_(computing) (Year: 2022).*

* cited by examiner

*Primary Examiner* — Yair Leibovich
(74) *Attorney, Agent, or Firm* — Norton Rose Fulbright US LLP; Gerard Messina

(57) ABSTRACT

A control unit having a plurality of error shutdown interfaces by which, upon activation, in each case one or more components to be controlled by the control unit is/are able to be switched off. The control unit is set up to run one or more different applications, each of which is equipped to trigger an error shutdown if necessary, the control unit additionally being set up to provide internal interfaces for the one or more applications. The internal interfaces and the error shutdown interfaces are predefinably assignable to each other, so that in response to an invocation of one of the internal interfaces, the one or more error shutdown interfaces assigned to it is/are activated. A method for operation of the control unit is also described.

11 Claims, 4 Drawing Sheets

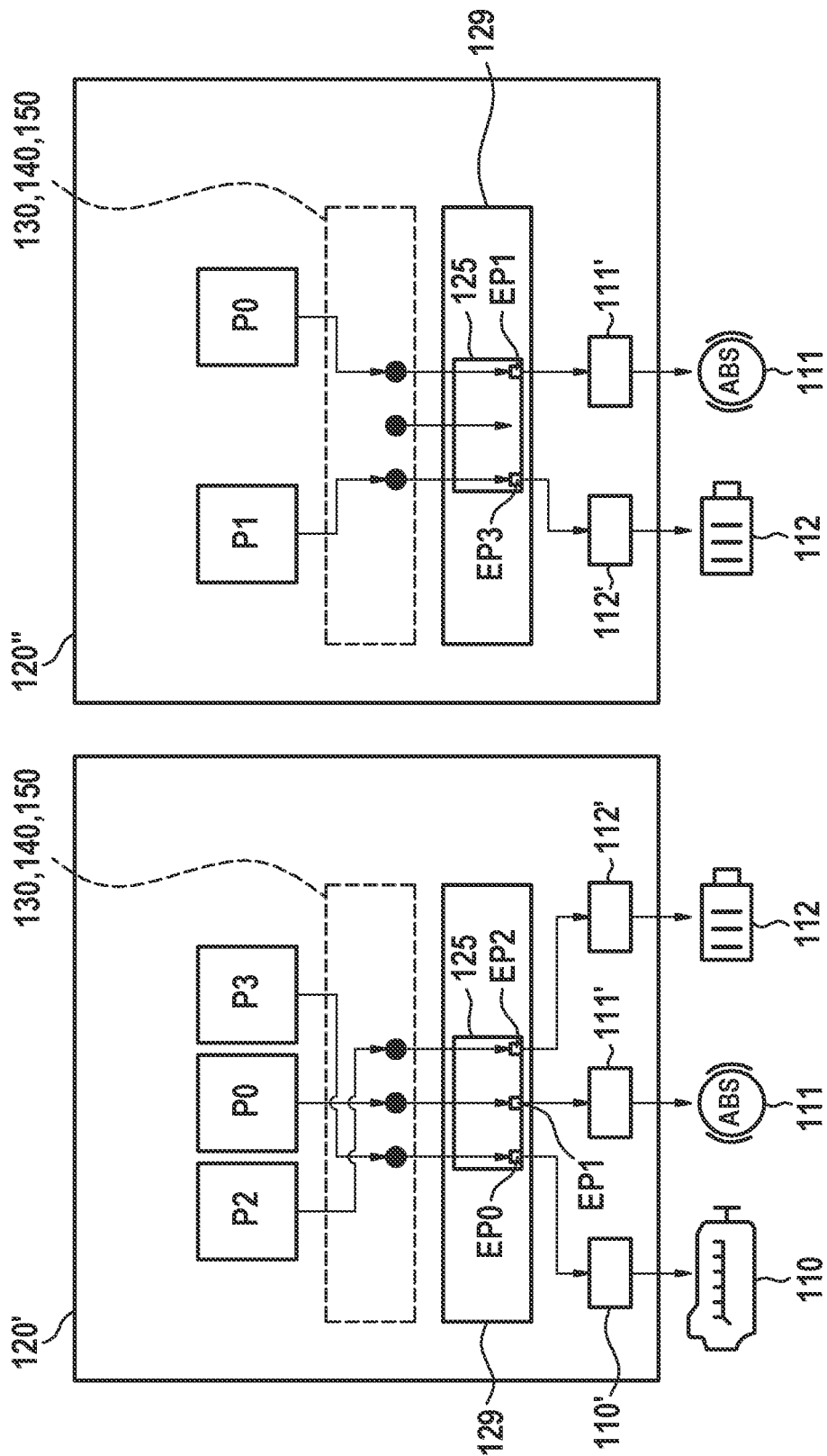

CONTROL UNIT AND METHOD FOR OPERATING A CONTROL UNIT

CROSS REFERENCE

The present application claims the benefit under 35 U.S.C. § 119 of German Patent Application No. DE 102020204349.3 filed on Apr. 3, 2020, which is expressly incorporated herein by reference in its entirety.

FIELD

The present invention relates to a control unit having the capability of a shutdown on errors, a method for operating such a control unit as well as a computer program for its implementation.

BACKGROUND INFORMATION

In control units as used particularly in vehicles or motor vehicles—there mostly in their microcontroller—what is referred to as an error management module (EMM) may be provided, with which errors that occur or may occur during operation of the control unit are managed. In so doing, a specific reaction may be predetermined for specific errors, for example. Typical errors which may be reported to this module are, e.g., those from overvoltage monitoring of the microcontroller, lockstep errors or what are commonly known as "error correction code" errors.

As reaction, such a module may trigger a redundant faster shutdown path to an external watchdog (concerning this see also the commonly-called 3-level monitoring concept) to thus, for instance, depending on the application, shut down torque-giving output stages, e.g., for injection, throttle valve or safety-related communication (e.g., calculated torque requirement, starter demand). In addition, availability measures such as a reset or NMI (non-maskable interrupt) may be configured.

Moreover, typically a (physical) error shutdown interface or what is referred to as an "errorpin" is provided in the control unit or on the microcontroller, the errorpin being activated if necessary, whereby a corresponding component such as an output stage, for example, is then shut down.

In addition, a reaction of this module may be requested for recognized errors from a software (which runs in the control unit). A software abstraction layer may be provided for this to coordinate various software requests and to prevent individual software components from being able to unintentionally enable the error shutdown interface or the errorpin, which could lead to an implausible state.

In the case of a typical control unit, a functionality or application which is provided may only be shut down completely at the control-unit level, for example. Thus, in a dedicated gasoline-engine control unit, for instance, the internal combustion engine may be stopped by switching off the injection and the throttle valve via the error shutdown interface. For example, in the case of an engine control unit, German Patent Application No. DE 10 2015 213 831 A1 describes switching off an output stage for a pressure control valve and a trigger circuit for injectors.

In control units which provide multiple applications, e.g., an engine control unit and transmission control unit, the independence of an application is even further restricted, since the error shutdown interface shuts down all safety-related output stages (e.g., for the injection of the engine control unit and the valve control of the transmission control unit), even though the error is only in the control path of the engine control unit, for example. Both scenarios lead to a restriction of availability, up to the point of a breakdown.

In addition, the hardware layout in a control unit is fixed as a rule, and cannot be changed afterwards. If a control unit provides multiple applications, they must be adapted specifically to the existing error shutdown interfaces. Thus, shifting an application to another control unit with different hardware wiring (the basic shutdown path nevertheless being the same) is not possible without adaptation.

SUMMARY

The present invention provides a control unit, a method for operating a control unit as well as a computer program for its implementation. Advantageous example embodiments and refinements of the present invention are described herein.

The present invention deals with a control unit and its operation. Such a control unit, particularly its microcontroller, has a plurality of (physical) error shutdown interfaces, the "errorpins" mentioned above, by which, upon activation, in each case at least one component to be controlled by the control unit is able to be switched off. In particular, the component may be a device present in the control unit, such as a trigger circuit (e.g., ASIC), output stage, etc., but it is also possible that it is an external component linked to the control unit—and there then to the error shutdown interface, as well.

The control unit is set up to run one or more different applications, each of which is equipped to trigger an error shutdown, if necessary. Such applications may include a software part that is provided, e.g., especially for the operation of a specific component or unit in a vehicle such as an internal combustion engine, an electric machine or a transmission, for instance. They may also include a hardware part, e.g., special application modules for carrying out specific functions of the application (e.g., ICs, ASIC, etc.). They may even be distributed over several control units, that is, may include parts which are not realized in the control unit in question. As already mentioned at the outset, such applications are designed or equipped so as, if necessary— that is, if an error has been detected, for example—to trigger (or initially request) an error shutdown. In this context, for example, the applications may be run in partitions of the control unit assigned to each of them.

In addition, the control unit is set up to provide internal interfaces for the one or more applications, the internal interfaces and the error shutdown interfaces being predefinably assignable to each other, so that in response to an invocation of one of the internal interfaces, the one or more error shutdown interfaces assigned to it is/are activated. Expediently, the internal interfaces and the error shutdown interfaces are predefinably assignable to each other with the aid of software configuration, e.g., utilizing a suitable configuration table. Prior to use of the control unit in a vehicle, for example, advisedly during its manufacture, the configuration may then be carried out according to the demands or requirements, namely, especially also as a function of the applications to be run in the control unit.

Moreover, the control unit is set up preferably in such a way that one or more hardware error sources and the error shutdown interfaces are predefinably assignable to each other, so that in response to the appearance of an error in the one or one of the hardware error sources, the one or more error shutdown interfaces assigned to it is/are activated. The one or more hardware error sources and the error shutdown interfaces are advantageously predefinably assignable to each other with the aid of hardware configuration, e.g., utilizing configurable logic gates with likewise a suitable configuration table, for example. Prior to use of the control unit in a vehicle, for example, advisedly during its manufacture, the configuration may then be carried out according to the demands or requirements. In this context, the hardware error sources are assigned expediently to different partitions in which applications are able to be run, as well.

In this way, flexible allocation becomes possible between the error shutdown interfaces or errorpins and the applications, the applications remaining abstracted from the hardware layout. Applications may thereby have different shutdown paths. In addition, availability is increased owing to the possibility of the partial shutdown for high-availability systems (to the point of autonomous or automated driving). Lastly, interferences between individual applications are also avoided, since separate shutdown paths and error shutdown interfaces, respectively, are able to be assigned. In addition, a certain cost-saving is realized due to the representation of several independent applications in one control unit, which are able to be switched off independently of each other. A further cost-saving is obtained due to lower development expenses, since applications are usable unchanged in different control units.

Furthermore, the control unit is preferably set up so as, upon an invocation of one of the internal interfaces, to enter the invocation into a buffer memory of the assigned error shutdown interface, if such a one is not yet present, and in response to a deactivation request, to remove the invocation from the buffer memory, and to activate the error shutdown interface if an invocation is entered in the buffer memory, and to deactivate the error shutdown interface if no invocation is entered in the buffer memory and no error of the hardware error source is present which is assigned to the error shutdown interface. A simple and reliable implementation of the activation and possibly deactivation of the error shutdown interfaces is thereby possible.

The control unit advantageously has a safety-related error shutdown interface and is set up in such a way that the safety-related error shutdown interface is assignable to one predefinable error shutdown interface of the plurality of error shutdown interfaces, so that if the predefinable error shutdown interface becomes activated, the safety-related error shutdown interface is activated, as well. The safety-related error shutdown interface and the error shutdown interfaces are expediently assignable to each other by hardware configuration, e.g., as described previously. Prior to use of the control unit in a vehicle, for example, advisedly during its manufacture, the configuration may then be carried out according to the demands or requirements. In principle, the safety-related error shutdown interface may be formed like the rest of the error shutdown interfaces, however may be or is interconnected in such a way that as a result, a safety-related component is (or can be) switched off if another error occurs which, as such, may have nothing directly to do with this safety-related component. It should be understood that even further such safety-related error shutdown interfaces may be provided, which then are assignable in the same way.

In addition, the control unit is preferably set up in such a way that upon appearance of an error in a module in which the error shutdown interfaces are or become assigned, all error shutdown interfaces become activated. This ensures that an error in an application (software and/or hardware) does not occur later which, however, because of the error in the module, no longer leads to activation of the error shutdown interface. This consequently represents a kind of precautionary measure.

In summary, the present invention thus provides a possibility to expand the existing errorpin handling (that is, the management of error shutdown interfaces) as explained at the outset, by a scalable number of error shutdown interfaces or errorpins (mostly hardware-dependent), which are able to be assigned flexibly to different applications, thus permitting a partial shutdown of an application within a control unit. This leads to an increase of availability and lower development costs.

In a hybrid system in which, for example, the control unit of the electric motor (or rather generally of the electric machine) is also integrated into the control unit of the internal combustion engine, in the event of an error in the control path of the electric motor, for example, the vehicle can thus still be driven home or to a garage, if only the output stages of the electric motor are switched off (naturally, this holds true conversely for the output stages of the internal combustion engine, as well).

In systems (or control units) having an engine management and integrated transmission management, there are system designs, for example, in which switching off the transmission leads to the engagement of a low gear. Here, as well, the present invention makes it possible, for example, that an error in the control path of the transmission control unit still permits travel to a garage without the internal combustion engine (or the drive in general) likewise having to be switched off.

In a communication control unit having a plurality of communication channels, the possibility is given, for example, to shut down only the faulty communication channel (fail silent), while the other communication channels not affected continue to be able to transmit.

In addition, the control unit is equipped preferably to operate at least one, particularly at least two, of the following units: an internal combustion engine, a transmission, an electric machine, an energy accumulator device, a brake system, data transmission- or communication devices, a fuel cell, a DC voltage converter or DC/DC converter, a steering system, a driver-assistance system and a urea-metering system. For example, the control unit may thus be an engine control unit, a transmission control unit, a battery control unit, a fuel-cell control unit, a control unit for a vehicle electrical system, a steering-system control unit or a control unit for urea metering. For instance, the control unit may likewise serve as two of these control units simultaneously.

In addition, the subject matter of the present invention includes a method for operating a control unit, particularly according to the present invention, having a plurality of error shutdown interfaces by which, upon activation, in each case at least one component to be controlled by the control unit is able to be switched off. In this connection, one or more different applications are run in the control unit, an error shutdown being triggered by the or one of the applications if necessary, by invoking an internal interface assigned to the application. At the same time, the internal interface is assigned to one of the error shutdown interfaces and activates it (that is, the error shutdown interface). An error in or in the case of one or more hardware error sources is also assigned expediently to one of the error shutdown interfaces and then activates it.

If such an application is run in two different control units, then two different error shutdown interfaces may be assigned via the internal interface to the application, thus specifically one error shutdown interface each in each control unit, which do not correspond, however, thus, have a different concrete specification, for example.

A control unit according to the present invention, e.g., a control unit of a (motor) vehicle is equipped, particularly in terms of program engineering, to carry out a method of the present invention.

The implementation of a method according to the present invention in the form of a computer program or computer-program product having program code for carrying out all method steps is also advantageous, since the costs it entails are particularly low, especially if an executing control unit is already being used for other tasks and is therefore present in any case. Suitable data carriers for providing the computer program are, in particular, magnetic, optical and electrical memories like, e.g., hard disks, flash memories, EEPROMs and DVDs, among others. Download of a program via computer networks (Internet, intranet, etc.) is also possible.

Further advantages and refinements of the present invention are derived from the description herein and the figures.

The present invention is represented schematically in the figures on the basis of exemplary embodiments, and is described in the following with reference to the figures.

BRIEF DESCRIPTION OF THE DRAWINGS

FIG. 4 shows schematically two control units according to the present invention in different preferred specific embodiments.

DETAILED DESCRIPTION OF EXAMPLE EMBODIMENTS

Figure 1:
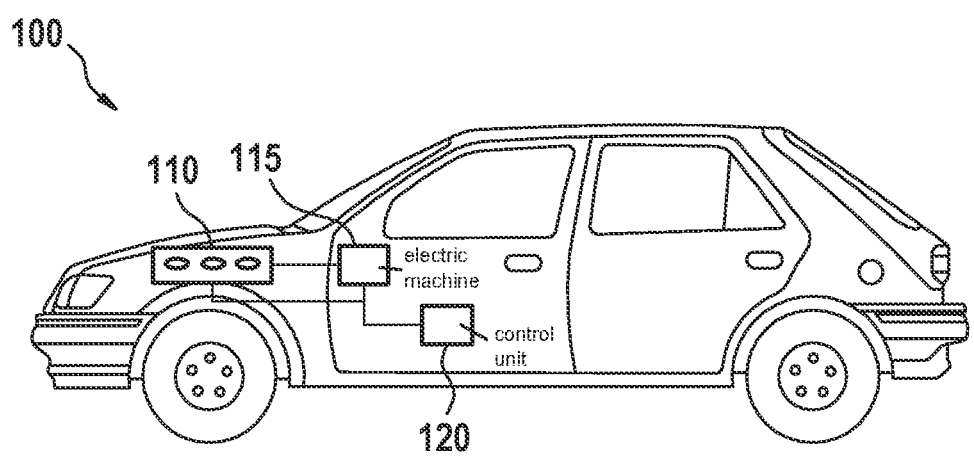
FIG. 1 shows schematically a vehicle having a control unit according to the present invention in one preferred specific embodiment of the present invention.

In FIG. 1, a vehicle 100 is shown schematically, having a control unit 120 according to the invention in one preferred specific embodiment. Control unit 120 is used, by way of example, for operating and/or control of an internal combustion engine 110 as well as an electric machine 115 as drive units in vehicle 100. However, this represents only one possible form and use of such a control unit as example for illustration purposes.

Figure 2:
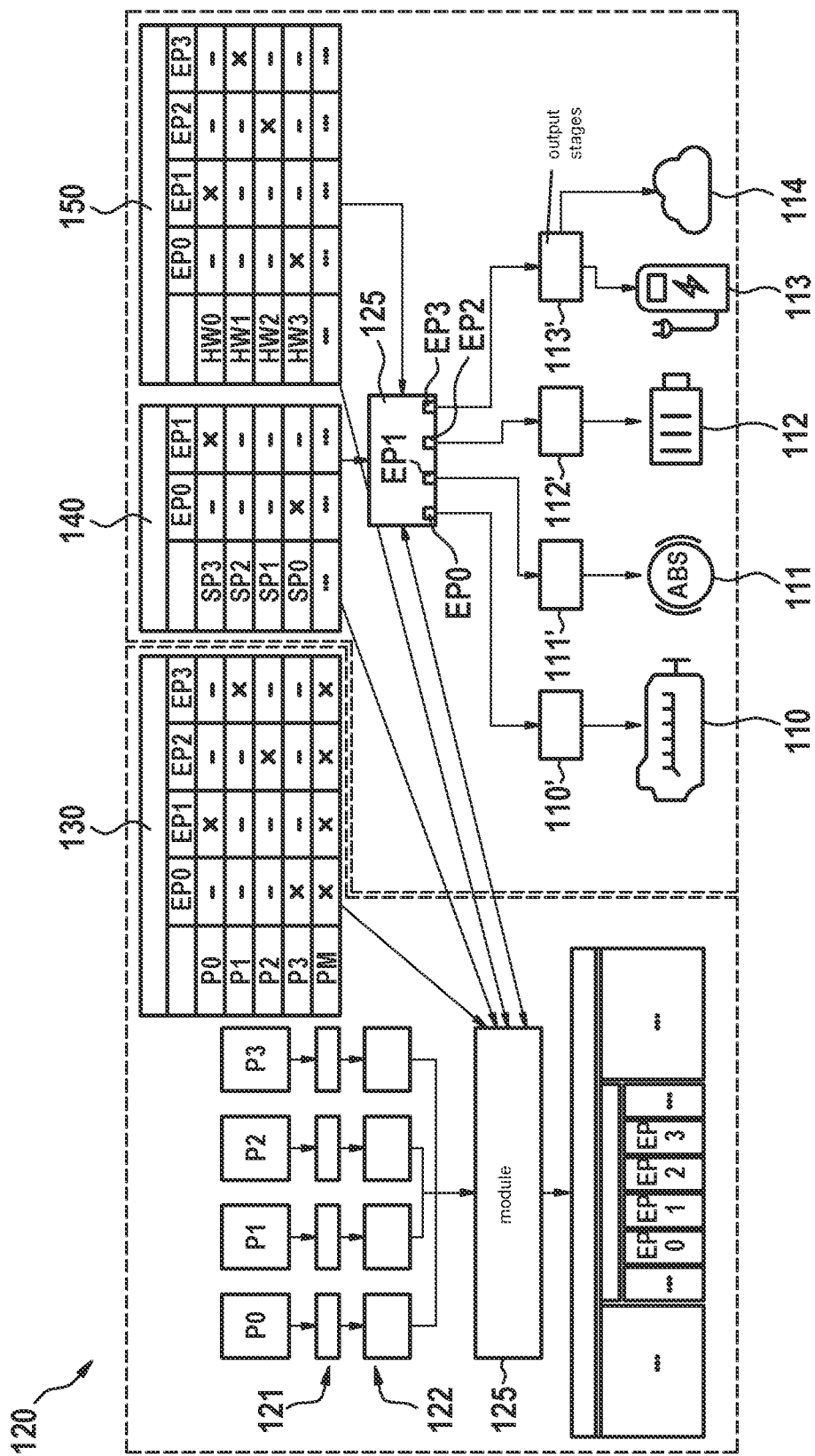
FIG. 2 shows schematically a control unit according to the present invention in a further preferred specific embodiment of the present invention.

In FIG. 2, a control unit 120 according to the present invention is shown schematically in a further preferred specific embodiment, based on which the intention is to explain in greater detail the design, in terms both of hardware and software, as well as the functional sequence during operation.

Control unit 120 may be the control unit shown in FIG. 1, four applications P0, P1, P2 and P3 being run here by way of example in control unit 120, each of which is assigned one of four error shutdown interfaces or errorpins EP0, EP1, EP2 and EP3. The error is triggered via a runtime environment (RTE) 121, for example, which is used as interface between the software components and the so-called basic software (BSW) 122. However, such an interface for the triggering may also be realized differently.

The assigning is accomplished with the aid of configuration table(s) in a module 125. As an example, within control unit 120 are output stages 110', 111', 112' and 113' for the control or operation of the following units: internal combustion engine 110, brake system 111, energy-accumulator device or battery 112 and communication device for battery charging station 113 and external units 114 (so-called cloud or other servers).

The assignment of applications P0, P1, P2 and P3 to their physical error shutdown interface is abstracted via a configuration table 130 developed in software. Thus, for example, error shutdown interface EP0 is assigned to application P3. In case of an error, only the output stages and communication are shut down which are coupled to their error shutdown interface EP0 (here engine output stage 110').

In addition, each error shutdown interface is assigned different hardware error sources HW0, HW1, HW2 and HW3 via a configuration table 150 formed in hardware (and to be loaded via software). For example, an error, or rather a hardware error in such a hardware error source must lead only to the shutdown of error shutdown interface EP0 (it is assumed here that the error lies only in the control path of application P3, e.g., ECC error in the memory of application P3).

Likewise, additional safety-related error shutdown interfaces or safety-critical pins SP0, SP1, SP2 and SP3 may be provided, which with the aid of a configuration table 140 formed in hardware (and to be loaded via software) react to the shutdown of an assigned error shutdown interface and are able to shut down, as well.

Thus, a hardware error has a direct effect on the error shutdown interface allocated to it and its assigned safety-critical pins. In the case of hardware errors which lie in the effective path PM of module 125 (containing an error handling SW), the corresponding error activates all error shutdown interfaces (including all safety-critical pins), since an execution is no longer ensured.

Figure 3:
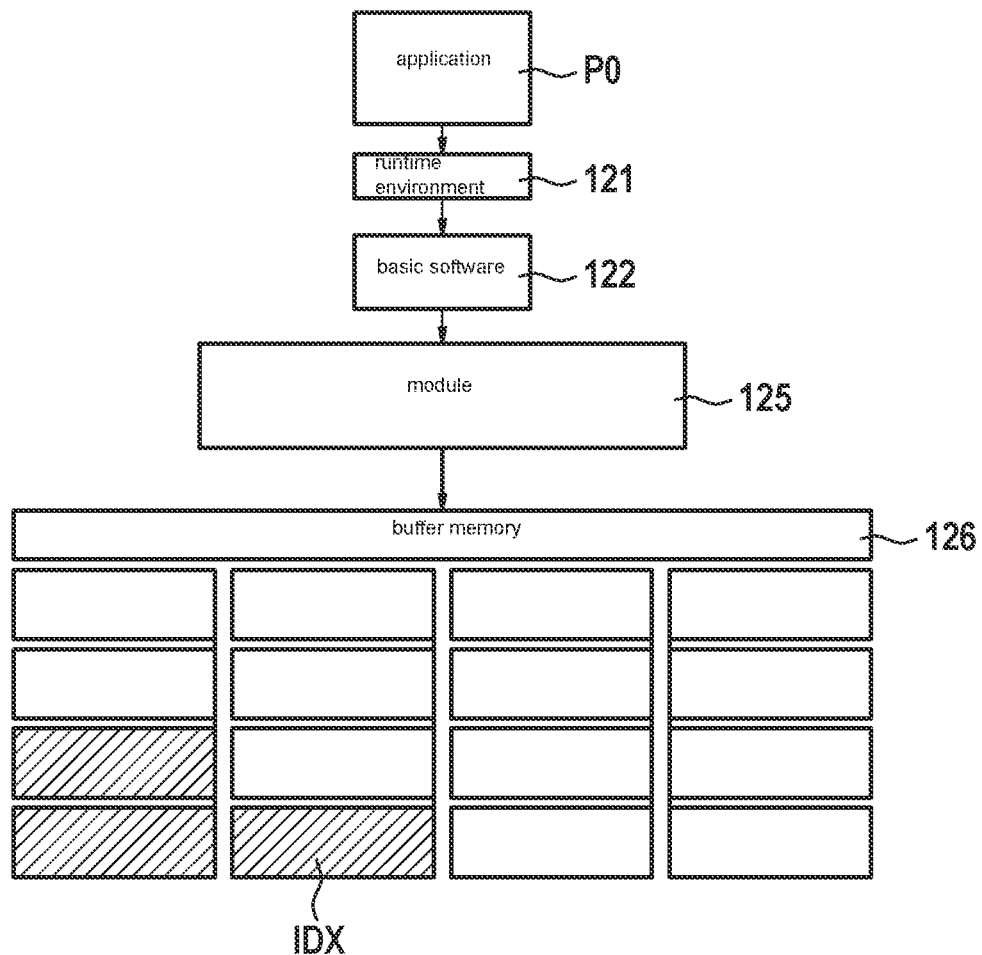
FIG. 3 shows the control unit from FIG. 2 in a detailed, but schematic view.

FIG. 3 shows the control unit from FIG. 2 in a detailed, but schematic view. Using application P0 as an example, a request for an activation of an error shutdown interface from the software part of the application is illustrated here.

The respective requests are managed in buffers or in a buffer memory 126, each error shutdown interface being assigned one buffer with a certain number of possible entries (represented by the 16 rectangles). Using a unique identification code IDX (this is only valid within one application), application P0 now invokes its error shutdown interface, that is, its activation, via internal or generic interface 122.

The interface in the software in the control unit is generic, that is, the invocation is exactly the same for a different application if the identification code IDX is assigned in the other application, as well. Module 125 receives the invocation and determines the partition from which the invocation comes. This may be accomplished via a core number, for example, on which application P0 runs, or via a task number from the operating system.

With the aid of the configuration table, module 125 is then able to ascertain the appropriate error shutdown interface. This error shutdown interface may also be multiple error shutdown interfaces or even no error shutdown interface at all if an application plays no role in terms of safety in a scenario.

In response to an activation request, module 125 enters identification code IDX and the invoking application into the buffer of the ascertained error shutdown interface, if the invocation is not already entered. In response to a deactivation request, the entry in the buffer is erased. As soon as a buffer contains an entry, the associated error shutdown interface is activated. If a buffer no longer contains an entry, the associated error shutdown interface is deactivated, as soon as no hardware error which is assigned to the error shutdown interface is active any longer.

The ascertainment of the status of individual hardware errors may be read out in module 125. The pertinent error shutdown interface is activated and deactivated via the module, a separate hardware source being addressed for this purpose via software.

An additional error shutdown interface may be simulated via software if, for example, the hardware has limited resources. For that, the module (the errorpin handler SW) takes over the shutdown of any given pin of a microcontroller, if an error has been detected. For hardware errors, for example, this may be carried out by polling the respective statuses of the module, or in interrupt-controlled fashion, starting from the module. In response to requests from the application or software (request of the errorpin simulated in SW), the handling is equivalent to the previous description, in that a corresponding buffer is assigned to the error shutdown interface simulated in SW, as well.

An error in the effective path of the errorpin handler SW leads automatically to the shutdown of all error shutdown interfaces including the error shutdown interfaces simulated in software, since a central error shutdown interface for the module or the errorpin handling SW is used for this, which leads to the shutdown of all safety-related pins.

Two control units 120' and 120" according to the present invention are represented schematically in FIG. 4 in different preferred specific embodiments. The basic design or basic functioning of control units 120' and 120" corresponds to that of control unit 120 according to FIG. 2, so that reference is made to the description there, as well.

By way of example, control unit 120' has only applications P0, P2 and P3 as well as error shutdown interfaces EP0, EP1 and EP2. The transfer to the appropriate error shutdown interfaces between the applications and the hardware is abstracted via a configuration layer, including the configuration tables (130, 140 and 150) explained with reference to FIG. 2. Scenarios are also conceivable where, for reasons of hardware engineering (e.g., decouplings), an application needs several error shutdown interfaces, or in other control units the application accesses the same error shutdown interface as another application, of if hardware resources are limited or high availability is not necessary.

The result is that the application in software only has to invoke the generic or internal interfaces for activation and/or deactivation of the error shutdown interfaces, thereby permitting more rapid development without adaptation to different control units. Thus, for example, application P0 in a control unit 120' may easily be shifted to control unit 120", even though a different application P1 is run here and the hardware circuitry is laid out differently in control unit 120". So, application P0 is assigned error shutdown interface EP1 in control unit 120', but error shutdown interface EP2 in control unit 120". (Error shutdown interface EP1 is not connected in control unit 120").

Overall, in this way, a control unit may be provided in which various applications are able to run, however the separate and different components that are controlled or operated by them are able to be switched off in case of an error.

With further reference to FIG. 4, specific embodiments are also preferred in which an application, here P0, for instance, is distributed over several control units. In this sense, an application in a control unit also includes only a part of the application.

What is claimed is:

1. A control unit, comprising:
   a plurality of error shutdown interfaces each of which, upon activation, switch off at least one component to be controlled by the control unit;
   wherein the control unit is configured to run one or more different applications, each of which is equipped to trigger an error shutdown, when an error is detected;
   wherein the control unit is additionally configured to provide internal interfaces for the one or more applications, one or more of the error shutdown interfaces are pre-assigned to each of the internal interfaces, so that in response to an invocation of one of the internal interfaces, the one or more error shutdown interfaces pre-assigned to the one of the internal interfaces is activated.

2. The control unit as recited in claim 1, wherein the control unit is further configured such that each of one or more hardware error sources is pre-assigned one or more of the error shutdown interfaces, so that in response to the appearance of an error in one of the one or more hardware error sources, the one or more error shutdown interfaces pre-assigned to the one of the one or more hardware error sources is activated.

3. The control unit as recited in claim 2, wherein the one or more hardware error sources and the error shutdown interfaces are pre-assigned to each other using hardware configuration.

4. The control unit as recited in claim 1, wherein the control unit includes a safety-related error shutdown interface, and wherein the control unit is configured such that the safety-related error shutdown interface is assigned to one pre-defined error shutdown interface of the plurality of error shutdown interfaces, so that if the pre-defined error shutdown interface becomes activated, the safety-related error shutdown interface is also activated.

5. The control unit as recited in claim 1, wherein the control unit is configured such that, in response to an appearance of an error in a module in which the error shutdown interfaces are or become assigned, all of the error shutdown interfaces are activated.

6. The control unit as recited in claim 2, wherein the control unit is configured so as, in response to an invocation of one of the internal interfaces, to enter the invocation into a buffer memory of the pre-assigned error shutdown interface if the invocation is not yet present, and in response to a deactivation request, to remove the invocation from the buffer memory, and to activate the error shutdown interface if the invocation is entered in the buffer memory, and to deactivate the error shutdown interface if no invocation is entered in the buffer memory and no error of the one or more hardware error sources pre-assigned to the error shutdown interface is present.

7. The control unit as recited in claim 1, wherein the internal interfaces and the error shutdown interfaces are pre-assigned to each other using software configuration.

8. The control unit as recited in claim 1, wherein the control unit is equipped to operate at least one of the following units: an internal combustion engine, and/or a transmission, and/or an electric machine, and/or an energy-accumulator device, and/or a brake system, and/or a data transmission- or communication device, and/or a fuel cell, and/or a DC/DC converter, and/or a steering system, and/or a driver-assistance system, and/or a urea-metering system.

9. A method for operating a control unit having a plurality of error shutdown interfaces which each, upon activation, switch off at least one component to be controlled by the control unit, the method comprising:

running in the control unit one or more different applications;

triggering an error shutdown by one of the one or more different applications when an error is detected, by invoking an internal interface assigned to the application;

wherein one of the error shutdown interfaces is assigned to the internal interface, and the assigned error shutdown interface is activated based on the invoking.

10. A method for operating two control units, each of the two control units having a plurality of error shutdown interfaces which each, upon activation, switch off at least one component to be controlled by a respective control unit, the method comprising:

running applications in the two control units;

triggering by a respective one of the applications, when an error is detected, a respective error shutdown by invoking a respective internal interface assigned to the respective application;

wherein the respective internal interface is assigned to a respective one of the plurality of respective error shutdown interfaces of the two control units, and the respective error shutdown interface is activated based on the invoking, the plurality of error shutdown interfaces not corresponding to each other.

11. A non-transitory machine-readable storage medium on which is stored a computer program for operating a control unit having a plurality of error shutdown interfaces which each, upon activation, switch off at least one component to be controlled by the control unit, the computer program, when executed by the control unit, causing the control unit to perform:

running in the control unit one or more different applications;

triggering an error shutdown by one of the one or more different applications when an error is detected, by invoking an internal interface assigned to the application;

wherein one of the error shutdown interfaces is assigned to the internal interface, and the assigned error shutdown interface is activated based on the invoking.

* * * * *